(12) United States Patent
Gensch et al.

(10) Patent No.: US 9,365,280 B2
(45) Date of Patent: Jun. 14, 2016

(54) GUTTER PROFILE AND AIRCRAFT

(75) Inventors: Hinnik Gensch, Hamburg (DE); Hauke Kirstein, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 164 days.

(21) Appl. No.: 14/116,811

(22) PCT Filed: May 14, 2012

(86) PCT No.: PCT/EP2012/058924
§ 371 (c)(1),
(2), (4) Date: Nov. 11, 2013

(87) PCT Pub. No.: WO2012/152947
PCT Pub. Date: Nov. 15, 2012

(65) Prior Publication Data
US 2014/0077035 A1 Mar. 20, 2014

Related U.S. Application Data

(60) Provisional application No. 61/485,152, filed on May 12, 2011.

(30) Foreign Application Priority Data

May 12, 2011 (DE) .......................... 10 2011 075 772

(51) Int. Cl.
*B64C 1/14* (2006.01)
(52) U.S. Cl.
CPC ................. *B64C 1/1461* (2013.01); *B64C 1/14* (2013.01)

(58) Field of Classification Search
CPC ...... B64C 1/14; B64C 1/1407; B64C 1/1453; B64C 1/1461
See application file for complete search history.

(56) References Cited

U.S. PATENT DOCUMENTS

| 4,506,851 | A | * | 3/1985 | Gupta et al. ............... 244/129.1 |
|---|---|---|---|---|
| 5,282,338 | A | | 2/1994 | Oliver |
| 6,736,353 | B1 | | 5/2004 | Erben |
| 7,331,421 | B2 | * | 2/2008 | Olsen et al. ................... 181/214 |
| 2009/0300991 | A1 | | 12/2009 | Paul |

FOREIGN PATENT DOCUMENTS

| DE | 2209190 | 8/1973 |
|---|---|---|
| DE | 19921326 | 6/2000 |

(Continued)

OTHER PUBLICATIONS

International Search Report, Oct. 16, 2012.
(Continued)

*Primary Examiner* — Tien Dinh
*Assistant Examiner* — Richard R Green
(74) *Attorney, Agent, or Firm* — Greer, Burns & Crain Ltd.

(57) ABSTRACT

A gutter profile for draining liquids on an aircraft, comprising a connecting section for connecting the gutter profile to an outer skin of the aircraft and comprising a drain section for forming a drain cross-section of the gutter profile. The drain section is pre-tensioned into a ground position which opens the drain cross-section and has a flow guiding device for transferring the drain section into a flight position which closes the drain cross-section. An aircraft having such a gutter profile is also disclosed.

9 Claims, 2 Drawing Sheets

(56) References Cited

FOREIGN PATENT DOCUMENTS

| DE | 102005045969 | 4/2007 |
|---|---|---|
| DE | 102006040383 | 3/2008 |

OTHER PUBLICATIONS

German Search Report, Mar. 15, 2013.
Preliminary Report on Patentability, Nov. 12, 2013.

* cited by examiner

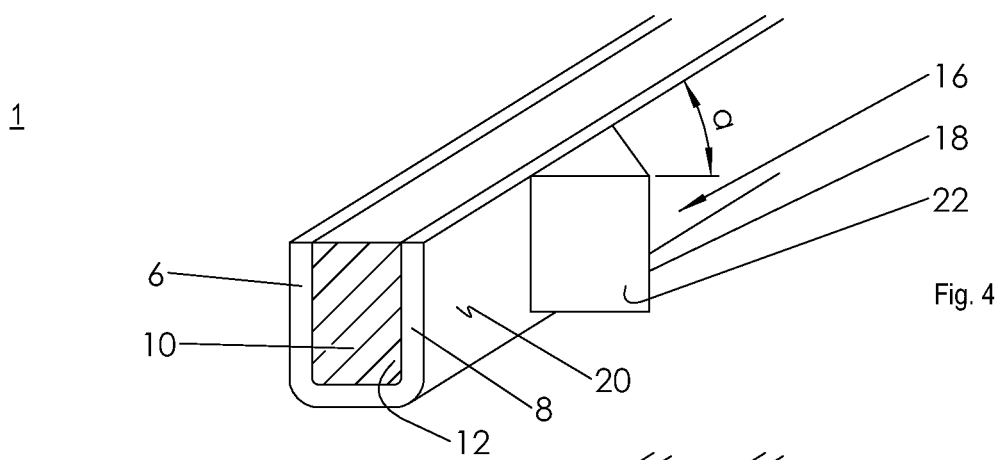
Fig. 4
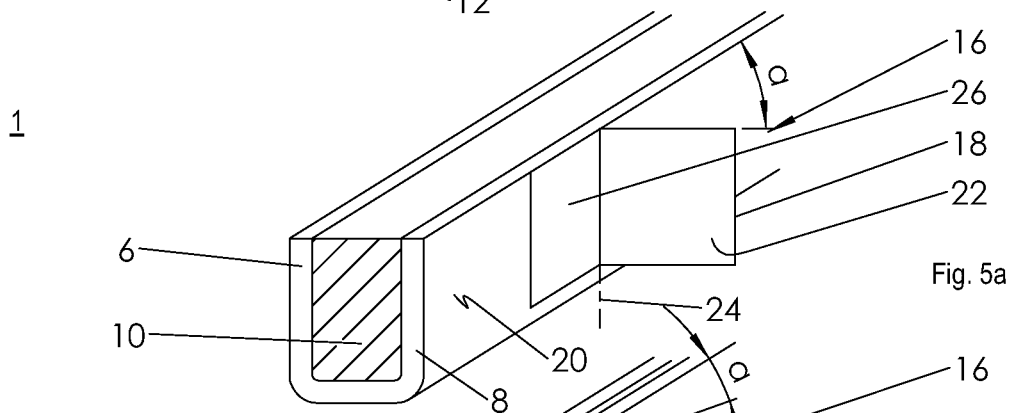
Fig. 5a
Fig. 5b
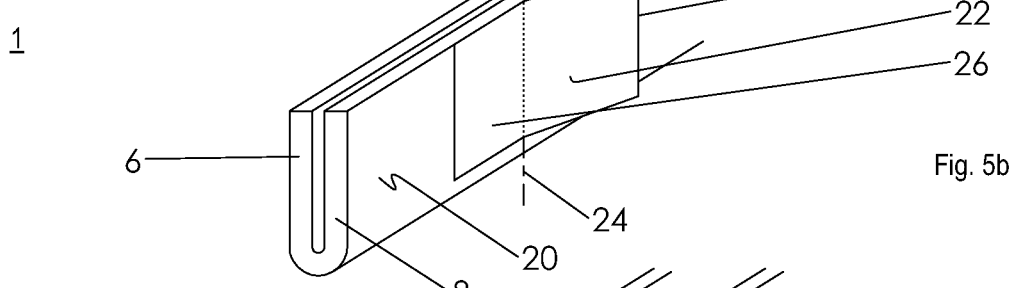
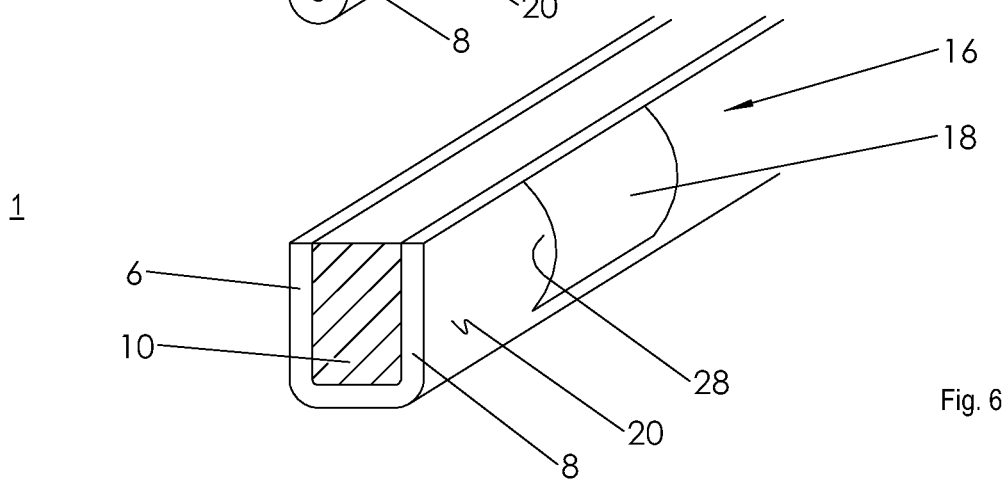
Fig. 6

GUTTER PROFILE AND AIRCRAFT

CROSS-REFERENCES TO RELATED APPLICATIONS

This application claims the benefit of the U.S. Provisional Application No. 61/485,152, filed on May 12, 2011, and of the German patent application No. 10 2011 075 772.4 filed on May 12, 2011, the entire disclosures of which are incorporated herein by way of reference.

BACKGROUND OF THE INVENTION

The invention relates to a gutter profile for the draining of liquids on an aircraft and an aircraft having such a gutter profile.

Gutter profiles for the draining of liquids in passenger aircraft are usually fixed above doors on a fuselage section. They are intended to guide liquids such as rainwater, condensation water, de-icing agents and the like laterally past the doors and thereby prevent any ingress of liquid into the door opening. However, since the gutter profiles are fixed externally on the aircraft fuselage, they project into the air flow and cause perturbing flow turbulence. In order to reduce flow turbulence, it is suggested in the German Patent Application DE 10 2006 040 383 A1 to configure the gutter profile with a moving drain section and the door with a cover section which projects in the vertical direction. The drain section defines a drain cross-section which is open in the ground position. In the flight position the drain section is pressed by the door-side cover section against the fuselage and the gutter profile covered. It has been shown however that in the event of vibrations and/or air flows, the cover section tends to hit against the fuselage with the result that, inter alia, the fuselage and the cover section become damaged.

SUMMARY OF THE INVENTION

It is the object of the invention to provide a gutter profile for draining liquids on an aircraft which eliminates the aforesaid disadvantages and automatically reduces its drain cross-section in flight, and to provide an aircraft having an optimised flow behaviour.

A gutter profile according to the invention for draining liquids on an aircraft has a connecting section for connecting the gutter profile to an outer skin of the aircraft and a drain section for forming a drain cross-section of the gutter profile. According to the invention, the drain section is pre-tensioned into a ground position which opens the drain cross-section and has a flow guiding device for transferring the drain section into a flight position which closes the drain cross-section.

With increasing aircraft speed and therefore with increasing inflow pressure on the flow guiding device, said flow guiding device brings about an automatic contact of the drain section against the connecting section or the fuselage outer skin, whereby the gutter profile no longer projects so far into the air flow and less perturbing flow turbulence is formed. The pre-tensioning of the drain section thereby ensures that when the inflow pressure is reduced and therefore on the ground, the gutter profile opens automatically and liquids are channelled off.

The drain section is preferably formed in one piece with the connecting section and at least in the connecting region consists of an elastically deformable material. The gutter profile thereby forms a one-piece integral structure and can, for example, be conveniently produced by injection moulding. By pre-tensioning the elastic material into the ground position, tensioning elements such as springs or the like can be dispensed with in the presence of an elastic deformation.

In order to ensure a harmonic load distribution of the drain cross-section, it is advantageous if the flow guiding device has a plurality of guiding elements, which are disposed on an outer surface of the drain section facing away from the connecting section.

In one exemplary embodiment the guide elements are configured as wedge-shaped bodies. Such bodies have a defined angle of attack and are robust. In particular, they can be formed in one piece with the drain section and therefore with the gutter profile.

In another exemplary embodiment the guide elements are configured as pivotable guide plates having an angle of attack which is automatically adjustable as a function of an aircraft speed. The angle of attack is maximised in the ground position and is minimised with increasing speed and therefore in the flight position so that the guide plates always only offer so much resistance to the outer flow as is necessary to close the drain cross-sections.

In another exemplary embodiment, the guide elements are arcuate bodies, which each define a tunnel to the outer surface and bring about relatively little flow turbulence.

In another exemplary embodiment, the guide elements are configured as wing-like profiles, which are profiled in such a manner that these move in the direction of the outer skin in the flight position.

A preferred aircraft is provided with respectively one gutter profile according to the invention at least in the area of its passenger doors. Such an aircraft is characterised by an optimised surface or outer flow, a reduced fuel consumption and by reduced external noise.

For further optimisation of the outer flow, the gutter profiles can be oriented in the flow direction.

Other advantageous exemplary embodiments of the invention are the subject matter of further subclaims.

BRIEF DESCRIPTION OF THE DRAWINGS

Preferred exemplary embodiments are explained in detail hereinafter with reference to highly simplified schematic diagrams. In the figures:

FIG. 4 shows a first exemplary embodiment of a flow guiding device of the gutter profile, FIGS. 5a and 5b show a second exemplary embodiment of a flow guiding device of the gutter profile and FIG. 6 shows a third exemplary embodiment of a flow guiding device of the gutter profile.

DETAILED DESCRIPTION OF THE PREFERRED EMBODIMENTS

Figure 1:
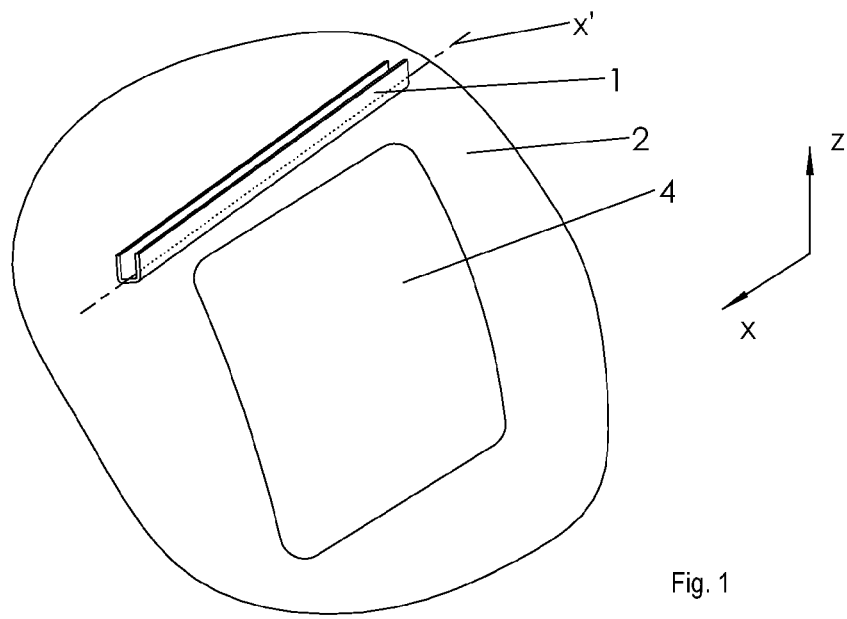
FIG. 1 shows a section of an aircraft fuselage in the area of a passenger door with a gutter profile according to the invention.

FIG. 1 shows a highly simplified diagram of a gutter profile 1 for draining liquids, which is inclined on a fuselage section 2 of an aircraft with respect to the longitudinal direction x and is disposed above a passenger door 4 when viewed in the vertical direction z. The gutter profile 1 is thereby inclined with its profile longitudinal axis x' with respect to the longitudinal axis x in such a manner that it runs in the direction of an outer flow or air flow in flight.

Figure 2:
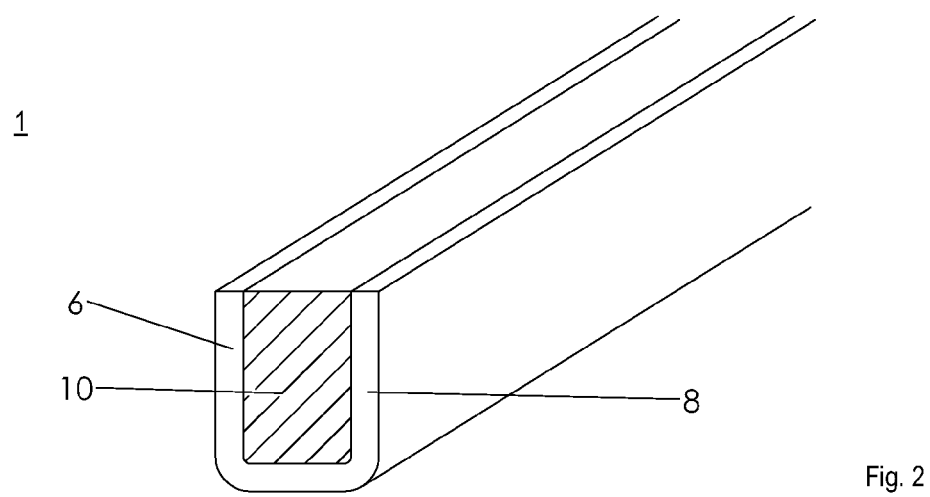
FIG. 2 shows the gutter profile from FIG. 1 in a ground position.

According to FIG. 2, the gutter profile 1 is configured to be U-shaped with a strip-like connecting section 6 for connecting the gutter profile 1 to the fuselage section 2 and having an L-shaped drain section 8 for defining a drain cross section 10 shown hatched. Naturally, other profiles such as a V-profile are also conceivable. The gutter profile 1 is preferably formed in one piece and consists of a plastic material, which is preferably fibre-reinforced. However, it can also be metallic. However, at least in the connecting region or articulation region of the drain section 8 with the connecting section 6, it is configured to be elastic and thus enables a movement of the drain section 8 about the profile longitudinal axis x' relative to the connecting section 6. The articulation region is preferably configured as a film hinge. The drain section 8 can, however, also be configured to be completely elastically deformable, which is particularly advantageous when forming the gutter profile 1 with the exemplary U-shaped profile shown.

The drain section 8 is pre-tensioned in the direction of a ground position so that in the ground position as shown in FIG. 2 it is opened towards the top and at the ends. As a result of the orientation of the gutter profile 1 in the direction of the outer flow, the liquids such as rainwater or de-icing agent are therefore passed by the passenger door on the cockpit side and according to the diagram in FIG. 1 to the left.

Figure 3:
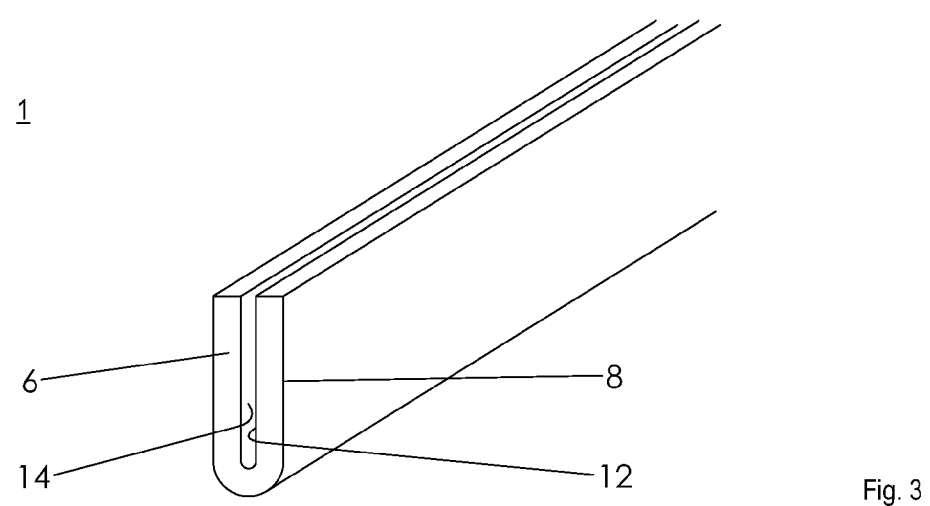
FIG. 3 shows the gutter profile from FIG. 1 in a flight position.

In a flight position sketched in FIG. 3, the drain section 8 is pressed with its inner surface 12 towards an opposite contact surface 14 of the connecting section 6 as a result of an incipient inflow pressure and the drain cross-section 10 is thereby closed.

As shown in FIGS. 4, 5a, 5b and 6, the gutter profile 1 has a flow guiding device 16 for closing the drain cross-section 10 in the flight position.

According to FIG. 4, a first exemplary embodiment of the flow guiding device 16 has a plurality of wedge-like guide elements 18 which in the longitudinal direction of the gutter profile 1 are connected to an outer surface 20 of the drain section 8 opposite to the inner surface 12 in the longitudinal direction of the gutter profile 1. Said guide elements are formed integrally with the connecting section 8 and have an inflow surface 22 inclined by an angle of attack α to the outer surface 20 and in the opposite direction to the outer flow. Said guide elements can, however, also be connected subsequently to the outer surface 20 in a firmly bonded manner. They are preferably disposed at a regular distance from one another. The guide elements 18 are advantageously disposed in such a manner to one another that the outer flow has stabilised before flowing onto the respectively following guide element 18, i.e. the vortex caused by the respectively preceding guide element 18 has petered out and an at least approximately laminar inflow to the respectively following guide element 18 is accomplished.

In a moving aircraft, the outer flow impinges upon the inflow surfaces 22, whereby these are exposed to an inflow pressure. The inflow pressure is dependent on the aircraft speed and increases with increasing aircraft speed. As soon as the inflow pressure is greater than the pre-tension of the drain section 8, this is pressed against the connecting section 6 and the drain cross-section 10 is closed. The gutter profile 1 now projects minimally into the outer flow. With decreasing aircraft speed, the inflow pressure decreases and the drain cross-section 10 is opened by the relaxing drain section 8.

According to FIGS. 5a and 5b, a second exemplary embodiment of the flow guiding device 16 has a plurality of plate-like pivotable guide elements 18 unlike the first exemplary embodiment according to FIG. 4. The guide elements 18 each form an inflow surface 22 and are each pivotable about a pivot axis 24 running transverse to the outer flow. As a result, the guide elements 18 each have a variable angle of attack α which is maximised in the ground position (FIG. 5a) and is automatically minimised in the flight position as a function of the inflow pressure present in each case and therefore as a function of the respective flight speed (FIG. 5b). The guide elements 18 consist of plastic and have a fastening section 26 by which means they are connected to the outer surface 20 of the drain section 8 in a firmly bonded manner. In order to avoid tensioning elements, said guide elements are pre-tensioned in the ground position and therefore in the direction of a maximum angle of attack α. The pre-tension is selected in such a manner that a minimal angle of attack α is only established when the drain cross-section 10 is completely closed.

According to FIG. 6, a third exemplary embodiment of the flow guiding device 16 has a plurality of bridge-shaped guide elements 18 unlike the aforesaid first exemplary embodiment and the second exemplary embodiment. The guide elements 18 are each formed as an arcuate body, which extends transversely to the outer flow and in each case defines a tunnel 28 running in the longitudinal direction of the gutter profile 1 to the outer surface 20. During flow through the tunnel 28 a negative pressure is produced in the area of the outer surface 20 and consequently a pressure gradient increases from the drain section 8 in the direction of the connecting cross-section 8, which brings about or at least assists a reliable closure of the drain cross-section 10.

A gutter profile for draining liquids on an aircraft, comprising a connecting section for connecting the gutter profile to an outer skin of the aircraft and comprising a drain section for forming a drain cross-section of the gutter profile, where the drain section is pre-tensioned into a ground position which opens the drain cross-section and has a flow guiding device for transferring the drain section into a flight position which closes the drain cross-section, and an aircraft having such a gutter profile are disclosed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE LIST

1 Gutter profile
2 Fuselage section
4 Door
6 Connecting section
8 Drain section
10 Drain cross-section
12 Inner surface
14 Contact surface
16 Flow guiding device
18 Guide element
20 Outer surface
22 Inflow surface
24 Pivot axis
26 Fastening section
28 Tunnel
x Aircraft longitudinal direction
x' Longitudinal axis of profile
z Aircraft vertical direction
α Angle of attack

The invention claimed is:

1. A gutter profile for draining liquids on an aircraft, comprising a connecting section for connecting the gutter profile to an outer skin of the aircraft and comprising a drain section for forming a drain cross-section of the gutter profile, wherein the drain section is pre-tensioned into a ground position which opens the drain cross-section and has a flow guiding device configured to transfer the drain section, with an increase of inflow air pressure on the flow guiding device, into a flight position which closes the drain cross-section, wherein the inflow air pressure is dependent on an aircraft speed and increases with increasing aircraft speed.

2. The gutter profile according to claim 1, wherein the drain section is connected in one piece with the connecting section and at least in the connecting region comprises of an elastically deformable material.

3. The gutter profile according to claim 1, wherein the flow guiding device comprises a plurality of guiding elements, which are disposed on an outer surface of the drain section facing away from the connecting section.

4. The gutter profile according to claim 3, wherein the guide elements are wedge-shaped bodies.

5. The gutter profile according to claim 3, wherein the guide elements are pivotable guide plates having an angle of attack which is automatically adjustable as a function of an aircraft speed.

6. The gutter profile according to claim 4, wherein the guide elements are arcuate bodies, which each define a tunnel to the outer surface.

7. The gutter profile according to claim 5, wherein the guide elements have wing-shaped profiles.

8. An aircraft having gutter profiles according to claim 1 disposed at least in the area of passenger doors.

9. The aircraft according to claim 8, wherein the gutter profiles are oriented in a flow direction of an air flow over a fuselage of the aircraft while it is in flight.

* * * * *